UNITED STATES PATENT OFFICE.

SARAH A. ELLIOTT, OF OXFORD, NORTH CAROLINA.

IMPROVEMENT IN REELS.

Specification forming part of Letters Patent No. 200,268, dated February 12, 1878; application filed January 17, 1878.

*To all whom it may concern:*

Be it known that I, SARAH A. ELLIOTT, of Oxford, in the county of Granville and State of North Carolina, have invented a new and valuable Improvement in Reels; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a perspective view of my invention. Fig. 2 is a side elevation, showing the reel folded. Fig. 3 is a side elevation of the clamp, showing it hinged or pivoted to the central shaft.

This invention has relation to reels designed to be used in factories and in the household, to wind skeins of various sizes, and to make skeins for fringes, and also for hanking and other purposes to which it may be adapted; and the object or purpose thereof is to construct a reel simple in its parts, and one that may be readily controlled by the operator.

The invention, therefore, consists in the construction and arrangement of the several parts, as will be hereinafter described, and subsequently pointed out in the claim.

In the accompanying drawings, A represents a central shaft, the lower end of which is bent around to form a clamp, $a$, and has a clamping-screw, $b$, for securing the reel to a table, chair-back, or other place convenient to the operator. Upon the shaft A is a sliding head, B, to which are pivoted or hinged arms C, of any desired number, said arms being held in a horizontal position, or at right angles to the shaft A, by a disk, D. The head B, with its arms C, may be held at any desired height upon the shaft A by a nut, $c$, which also slides upon the shaft, and is held thereon by a set-screw, $d$.

When it is desired to fold the arms C, as illustrated in Fig. 2 of the drawings, the disk D is turned until the slots $e$ therein register with the pivoted or hinged ends of the arms, when the same may be turned up parallel, or nearly so, with the central shaft A, and secured around the shaft by a rubber band or other suitable means.

When the reel is desired for use the arms are allowed to fall down in a horizontal position, after which the disk D is turned until the slots $e$ are between the arms, the disk being held firmly down upon the same by a coiled spring, $f$, passing around a sleeve, $g$, secured to the upper side of the disk. The lower end of the spring $f$ bears against the disk D, while the upper end thereof presses against an annular shoulder, $h$, secured to the upper part of the sleeve $g$. By this construction or means the arms C are firmly held in a horizontal position, and prevented, during their rotation, from being thrown up in a direction toward the central shaft A. For convenience in turning the disk D it is provided with a knob, $i$. Upon each of the arms C is a sleeve, $j$, having ears $k$, to which are pivoted rods E, the upper ends thereof being slightly curved in an outward direction, to prevent the material from slipping off. The sleeves $j$ may be adjusted at any distance to or from the ends of the arms C, for the purpose of winding skeins of different sizes, and when the reel is folded in a compact form the rods E can be folded upon the arms. A rubber ring, $m$, and a nut and set-screw, or other equivalent device, are secured upon the upper end of the shaft A, to form a rest for the spool or ball of material to be skeined.

To adapt my invention to a sewing-machine, the clamp $a$ is hinged or pivoted to the lower end of the shaft A, and when the reel is secured by the clamp to the table of the machine, the shaft, with its attachments, may be turned at right angles to the clamp, or parallel with the table, by sliding up the sleeve $n$.

By operating the foot-treadle of the machine, and thereby rotating the wheel, which also carries with it the horizontal rod, a ball of thread, worsted, or other material may be J. V. EMMITT.
Carriage-Top.
No. 200,269. Patented Feb. 12, 1878.
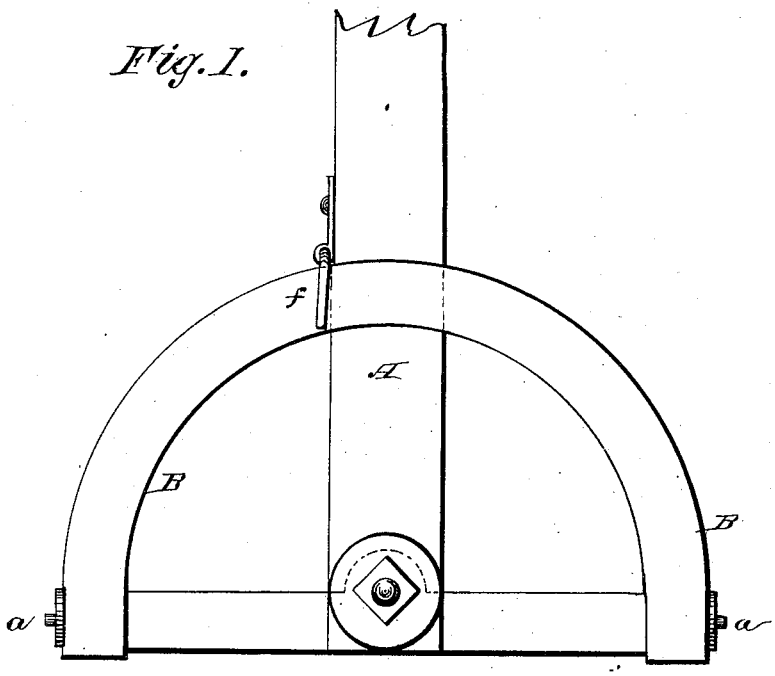
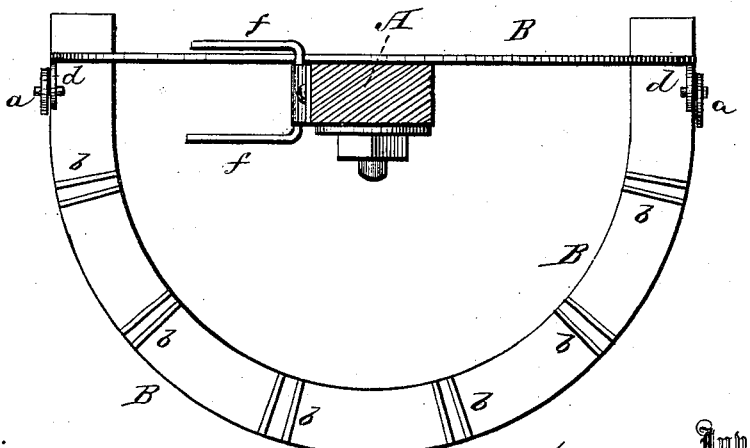

A suitable rod is secured to the revolving shaft that turns the sewing-machine wheel, so that it will project horizontally on the outside of the machine, so that it will turn with the wheel. A leather band is then placed over or around the rod and around the pulley-block F, formed on or projecting from the under side of the disk D. An annular shoulder, $o$, is formed upon the lower end of said pulley to prevent the band from slipping off.